United States Patent
Chang et al.

(10) Patent No.: US 9,049,416 B2
(45) Date of Patent: Jun. 2, 2015

(54) SYSTEM AND METHOD FOR CONSTRUCTING SCENE CLIP, AND RECORD MEDIUM THEREOF

(71) Applicant: INSTITUTE FOR INFORMATION INDUSTRY, Taipei (TW)

(72) Inventors: Chia-Hsiang Chang, Taipei (TW); Emery Jou, Taipei (TW); Jing-Fung Chen, New Taipei (TW); Pei-Wen Huang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 166 days.

(21) Appl. No.: 13/713,948

(22) Filed: Dec. 13, 2012

(65) Prior Publication Data

US 2014/0105570 A1    Apr. 17, 2014

(30) Foreign Application Priority Data

Oct. 17, 2012    (TW) .............................. 101138301 A (51) Int. Cl.
| | |
|---|---|
| H04N 9/80 | (2006.01) |
| H04N 9/87 | (2006.01) |
| H04N 5/76 | (2006.01) |
| H04N 21/222 | (2011.01) |
| H04N 21/43 | (2011.01) |
| H04N 21/433 | (2011.01) |
| H04N 21/44 | (2011.01) |
| H04N 21/845 | (2011.01) |
| H04N 9/82 | (2006.01) |

(52) U.S. Cl.
CPC . *H04N 9/87* (2013.01); *H04N 5/76* (2013.01); *H04N 9/8205* (2013.01); *H04N 21/222* (2013.01); *H04N 21/4307* (2013.01); *H04N 21/4334* (2013.01); *H04N 21/44012* (2013.01); *H04N 21/8456* (2013.01)

(58) Field of Classification Search
USPC .......... 386/239, 241, 248, 291, 278, 281, 353
See application file for complete search history.

(56) References Cited

U.S. PATENT DOCUMENTS 6,970,639 B1 * 11/2005 McGrath et al. .............. 386/290
8,526,793 B2    9/2013 Chun et al.
(Continued)

FOREIGN PATENT DOCUMENTS

| CN | 101778260 B | 7/2010 |
|---|---|---|
| TW | I309949 B | 5/2007 |

*Primary Examiner* — Hung Dang
*Assistant Examiner* — Mishawn Dunn
(74) *Attorney, Agent, or Firm* — Muncy, Geissler, Olds & Lowe, P.C.

(57) ABSTRACT

A system and method for constructing a scene clip, and a non-statutory record medium thereof are provided. The system includes media supply equipment, a metadata server, a scene server, and an end device. The media supply equipment is used for providing media data. The metadata server is used for providing scene time information corresponding to playback scenes of the media data. A first end device acquires the media data and the scene time information, and extracts, according to capture time information input when playing the media data, at least one piece of target scene time from each piece of the scene time information. The scene server acquires the media data and the target scene time, and according to an alignment result of the target scene time and each piece of the scene time information, extracts local scene clips from the media data to form a piece of media division data.

16 Claims, 8 Drawing Sheets

(56) References Cited

U.S. PATENT DOCUMENTS

| | | | |
|---|---|---|---|
| 2002/0120925 A1* | 8/2002 | Logan | 725/9 |
| 2003/0095789 A1* | 5/2003 | Wakimoto et al. | 386/52 |
| 2007/0248241 A1* | 10/2007 | Nagao | 382/100 |
| 2007/0291841 A1* | 12/2007 | Muraki et al. | 375/240.12 |
| 2009/0041422 A1* | 2/2009 | Staker et al. | 386/54 |
| 2009/0313324 A1* | 12/2009 | Brooks et al. | 709/203 |
| 2011/0234847 A1 | 9/2011 | Bigioi et al. | |

* cited by examiner

SYSTEM AND METHOD FOR CONSTRUCTING SCENE CLIP, AND RECORD MEDIUM THEREOF

CROSS-REFERENCE TO RELATED APPLICATION

This application claims the benefit of Taiwan Patent Application No. 101138301, filed on Oct. 17, 2012, which is hereby incorporated by reference for all purposes as if fully set forth herein.

BACKGROUND OF THE INVENTION

1. Field of Invention

The present invention relates to a system and a method for constructing a scene clip, and a record medium thereof, and more particularly to a system and a method for constructing a scene clip, and a record medium thereof, where the required scene clip is extracted using scene time information.

2. Related Art

In the prior art, a user may use an end device to acquire any type of media data from a network or media supply equipment and play the media data. However, generally, playback time illustrations of some wonderful clips on websites are only literal statements so that other people can learn about playback time points of the wonderful clips in the media data.

However, the media data, in many cases, is played in a linear playback manner. Image playback software may provide a time axis corresponding to playback of the media data. When learning about the playback time point of the wonderful clip, the user only can perform a location click on the time axis of the media data. Alternatively, the user can drag an axis latch on the time axis to try to acquire the playback time of the wonderful clip for viewing.

However, if not familiar with playback contents and the playback time points of the media data, the user needs to spend more time searching for a required video scene. Secondly, an accuracy degree of dragging the axis latch depends on a length of the time axis. If the time axis is too short, it is very difficult for the user to drag the axis latch to a required fixed point, and more operational troubles are brought to the user on the contrary. Thirdly, when the user wants to share a clip of the media data which the user is viewing/listening in to, the user must perform media capture using a media capture program or software. However, both acquisition and use of the software may bring about troubles to the user to a certain extent.

Therefore, how to improve the accuracy degree of media data sharing and simplify complexity of the media data sharing is a topic that should be taken into consideration by manufacturers.

SUMMARY OF THE INVENTION

In order to solve the above problem, the present invention discloses a system and a method for constructing a scene clip and a record medium thereof, where scene time information serves as a basis for selecting media division data.

The system for constructing a scene clip disclosed in the present invention comprises media supply equipment, a metadata server, a scene server, and a first end device.

The media supply equipment is used for providing media data. The metadata server is used for receiving the media data to provide multiple pieces of scene time information corresponding to playback scenes of the media data. The first end device is used for acquiring the media data provided by the media supply equipment and the scene time information provided by the metadata server, and is used for inputting a piece of capture time information corresponding to playback of the media data when playing the media data to extract at least one piece of first target scene time which matches the capture time information from the acquired scene time information and output the first target scene time to the scene server. The scene server is used for acquiring the first target scene time, the media data, and the corresponding scene time information, and aligning each first target scene time with the entire acquired scene time information to extract, according to alignment results, multiple local scene clips from the media data to form a piece of media division data.

The method for constructing a scene clip disclosed in the present invention comprises: providing, by media supply equipment, a piece of media data; receiving, by a metadata server, the media data to provide multiple pieces of scene time information corresponding to playback scenes of the media data; acquiring, by a first end device, the media data and the scene time information to extract, according to a piece of capture time information input when playing the media data, at least one piece of first target scene time corresponding to the capture time information from the entire scene time information; and acquiring, by a scene server, the first target scene time, the media data, and the scene time information to align the first target scene time with each piece of the scene time information to extract multiple local scene clips from the media data so as to form a piece of media division data.

In addition, the present invention also discloses a record medium, which stores an electronic device readable program code. When an electronic device reads the program code, a method for constructing a scene clip is executed. The method is described as above.

The present invention is characterized in that: end devices of other users can acquire the media division data which a user wants to share simply through the scene server. In addition to improvement of clarity of the media sharing, other users no longer need to spend more time searching for the required video scene from the media data. Secondly, other users can directly acquire the media division data shared by the user without taking trouble to control and operate the time axis of the media data. In addition to that the complexity of the image control is simplified, the operational trouble that the media division data cannot be acquired due to that other users have difficulties in dragging the axis latch to the required fixed point is avoided. Thirdly, the user can provide a media division to be shared without a specific media capture program or software.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention is described in the exemplary embodiments with reference to the accompanying drawings in the following.

Figure 1:
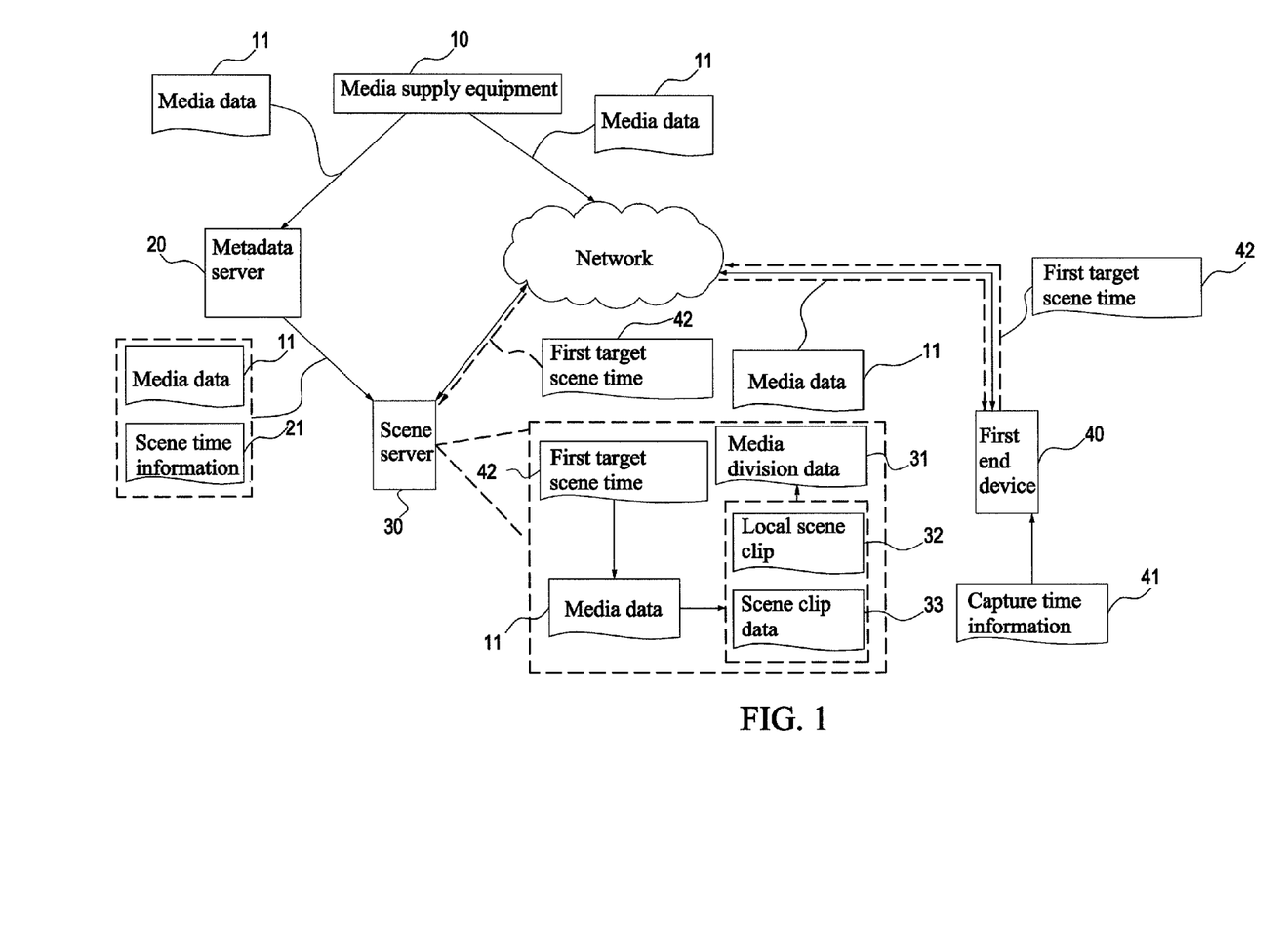
FIG. 1 is a schematic architecture diagram of a system for constructing a scene clip according to an embodiment of the present invention.

FIG. 1 is a schematic architecture diagram of a system for constructing a scene clip according to an embodiment of the present invention. The system is applicable to a device, equipment, or a system having a media playback capability, in which a configuration form is not limited. The system for constructing a scene clip includes a client side and a server side. Equipment and devices of the two sides are connected through a network. The server side includes media supply equipment 10, a metadata server 20, and a scene server 30. The client side includes more than one end device, which is an electronic device of a user, for example, an electronic device having a man-machine interface for a user to operate and a capability of connecting with the network, as a Personal Computer (PC), a notebook, a tablet PC, a smart phone, and a Set-Top Box (STB). In this embodiment, a first end device 40 is taken as an example for illustration.

The media supply equipment 10 is used for providing media data 11. The media data 11 may be whole data of image, voice, or video, or stream data transmitted in real time. The media supply equipment 10 may be equipment located at the same position with the metadata server 20 and the scene server 30, or may be third-party equipment located at a different position. However, the present invention is not limited thereto. A mode of outputting the media data 11 by the media supply equipment 10 includes cable and wireless data transmission manners including: broadcast, broadband distribution, cable transmission (for example, Community Antenna Television and Cable Television (CATV)), and network protocol transmission (for example, Internet Protocol Television (IPTV)). The present invention is not limited thereto either.

The media supply equipment 10 includes a composition of at least one of hardware having a media supply capability, a unit, an assembly, a device, equipment, and a system formed by software and the hardware, and the like. The media data 11 is formed by multiple scene clips. The media data 11 includes the scene clips of multiple different contents. For example, when the media data 11 is image data, the image data is an image frame having more than one content of an object, a scene, a character, and the like. For another example, if the media data 11 is voice data, the voice data is a voice frame having more than one content of treble, bass, sound of voice, music, and the like.

When acquiring the media data 11, the metadata server 20 may provide scene time information 21 corresponding to playback contents of the media data 11. The scene time information 21 is note data for interpreting the media data 11, or playback time points of the scene clips, and even playback contents included in the media data 11, for example, similar data for further illustrating the scene clips such as compendia of the playback contents, playback time, and titles of the scene clips. In this embodiment, each piece of the scene time information 21 records playback time of a corresponding scene clip thereof. Moreover, the scene time information 21 is supplied in a manner as follows: 1) the metadata server 20 directly constructs the scene time information 21 according to the playback contents of the media data 11, and 2) acquires the scene time information 21 corresponding to the media data 11 from an external device.

The first end device 40 includes a data input interface for the user to input data and also has a media playback capability. Moreover, a presentation end of the interface of the first end device 40 is designed depending on requirements of a designer. The present invention is not limited thereto. When playing the media data 11, the first end device 40 may be used for inputting a piece of capture time information 41. The capture time information 41 refers to a time point or a time interval corresponding to a playing division of the media data 11. The first end device 40 may extract at least one piece of first target scene time 42 from the entire scene time information 21 according to the capture time information 41 and output the at least one piece of first target scene time 42 to the scene server 30. Playback time recorded by the piece(s) of first target scene time 42 matches the capture time information 41.

The scene server 30 may acquire the first target scene time 42, the media data 11, and the scene time information 21. However, the media data 11 is acquired from the metadata server 20 or the media supply equipment 10. The scene server 30 may align the first target scene time 42 with each piece of the scene time information 21, extract local scene clips 32 from the media data 11 according to alignment results, and form the local scene clips 32 into a piece of media division data 31 so that the media division data 31 is shared to other end devices through the network.

However, according to data types included in the capture time information 41, the first end device 40 and the scene server 30 also perform different implementation actions, which are described in the following.

1) Each piece of the scene time information 21 stores playback time of a corresponding local scene clip 32 thereof. The capture time information 41 includes media record starting time and media record end time. When aligning the capture time information 41 with each piece of the scene time information 21, the first end device 40 acquires the first target scene time 42 with playback time recorded between the media record starting time and the media record end time and outputs the first target scene time 42 to the scene server 30 so that the scene server 30 forms the media division data 31.

2) The scene server 30 classifies all of the scene time information 21 according to record information of each piece of the scene time information 21 and then derives multiple pieces of scene clip data 33 from the media data 11 according to classification results. The capture time information 41 includes a piece of time point data. The first end device 40 may transmit the first target scene time 42 including the time point data to the scene server 30. The scene server 30 aligns playback starting time and playback end time of the time point data with those of each piece of the scene clip data 33 to extract a piece of target scene clip data 33 having playback time including the time point data so as to form the media division data 31.

Furthermore, the scene server 30 acquires data dependencies or types of data attributes of each piece of the scene time information 21 according to the playback contents of each piece of the scene time information 21 to classify the scene time information 21 and derive multiple pieces of scene clip data 33 according to classification results. The scene server 30 may construct a media playback tree structure out of each piece of the scene clip data 33 according to the data dependencies, the data attributes, and data level relationships of all of the scene time information 21. When acquiring the first target scene time 42, the scene server 30 may capture associated scene clip data 33 from the media playback tree structure according to the alignment results of the first target scene time and the entire scene time information 21 to form the media division data 31.

However, capture results such as the scene clips, the scene time information, the media playback tree structure, and a playback medium may be stored in the scene server 30 for use in a second operation for providing the media division data 31. Furthermore, the media division data 31 constructed through the operation of providing the scene clips, after being shared to other end devices, is directly stored in other end devices for direct retrieval and playback by playback software/hardware of the end devices.

Figure 2:
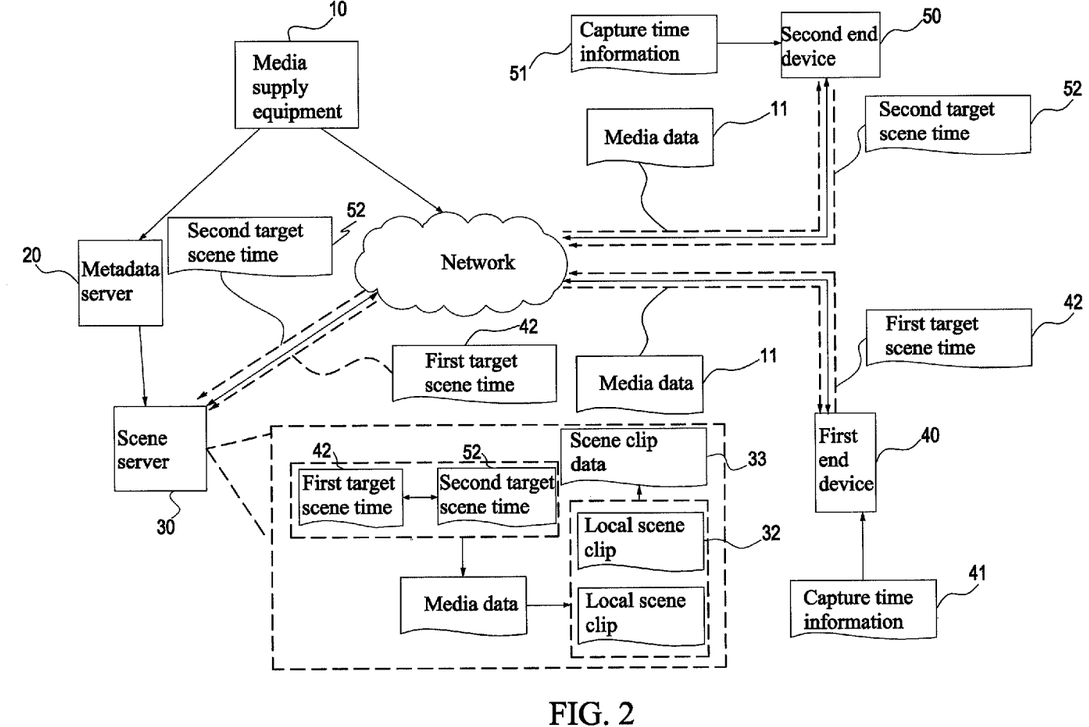
FIG. 2 is a schematic diagram of a data flow direction of media division data update according to an embodiment of the present invention.

FIG. 2 is a schematic diagram of a data flow direction of media division data update according to an embodiment of the present invention. The system further includes a second end device 50. In this embodiment, the scene time information 21 also records the playback contents of the media division data 31 (or the local scene clips 32, or the scene clip data 33).

The same as the operation of the first end device 40, the second end device 50 is also capable of acquiring the media data 11 and the scene time information 21. Moreover, another user may input, through a control interface of the second end device 50, a piece of capture time information 51 corresponding to playback of the media data when playing the media data 11. The second end device 50 may extract at least one piece of second target scene time 52 from the entire scene time information 21 according to the capture time information 51 and outputs the second target scene time 52 to the scene server 30. Playback time recorded by the piece(s) of second target scene time 52 matches the capture time information 51.

When the scene server 30 acquires the second target scene time 52, if it is judged that a media playback content recorded by the first target scene time 42 is the same as or equivalent to that recorded by the second target scene time 52 and the media playback time recorded by the first target scene time 42 is different from that recorded by the second target scene time 52, the scene server 30 may set a piece of playback modification time according to the media playback time recorded by the first target scene time 42 and that recorded by the second target scene time 52 so as to capture multiple adjustment clips whose playback time is within the playback modification time from the media data 11 to update the media division data 31.

The playback modification time is a connex set or an intersection set of a media playback time length recorded by the first target scene time 42 and that recorded by the second target scene time 52. Alternatively, starting time of the playback modification time is an average of the starting time of the media playback time recoded by the first target scene time 42 and that of the media playback time recoded by the second target scene time 52, and end time of the playback modification time is an average of the end time of the media playback time recorded by the first target scene time 42 and that of the media playback time recorded by the second target scene time 52. Alternatively, other associated or similar setting manners can be adopted. The setting manner is not limited to the foregoing setting manners, but is designed according to requirements of designers.

Figure 3:
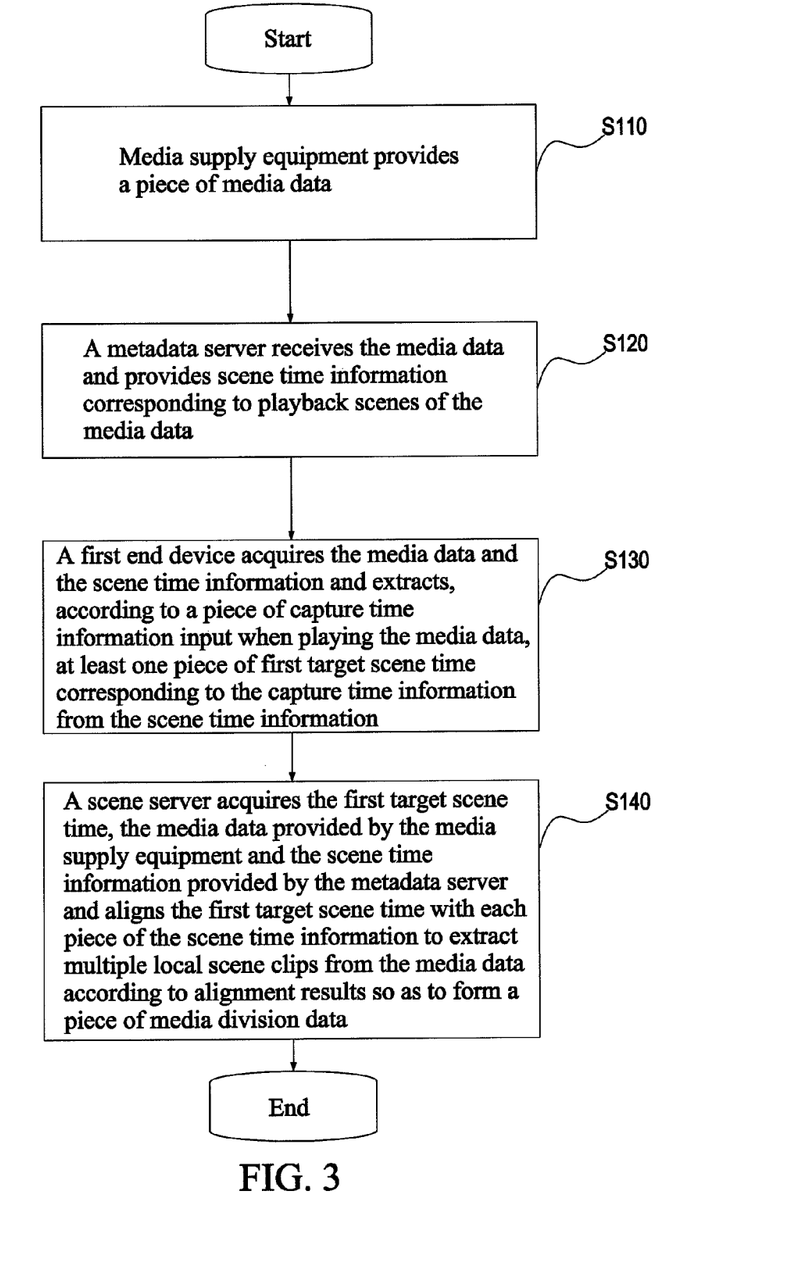
FIG. 3 is a schematic flow chart of a method for constructing a scene clip according to an embodiment of the present invention.

FIG. 3 is a schematic flow chart of a method for constructing a scene clip according to an embodiment of the present invention. With reference to FIG. 1 to FIG. 2 for better understanding, the flow of the method is described in the following.

Media supply equipment 10 provides a piece of media data 11 (Step S110). As stated above, the media data 11 provided by the media supply equipment 10 may be whole data of image, voice, or video, or stream data transmitted in real time. A transmission mode of the media data 11 includes cable and wireless data transmission manners including: broadcast, broadband distribution, cable transmission, and network protocol transmission.

A metadata server 20 receives the media data 11 and provides scene time information 21 corresponding to playback scenes of the media data 11 (Step S120). As stated above, the scene time information 21 is supplied in manners as follows: 1) the metadata server 20 directly constructs the scene time information 21 according to playback contents of the media data 11, and 2) acquires the scene time information 21 corresponding to the media data 11 from an external device.

A first end device 40 acquires the media data 11 and the scene time information 21 and extracts, according to a piece of capture time information 41 input when playing the media data 11, at least one piece of first target scene time 42 corresponding to the capture time information 41 from the scene time information 21 (Step S130). In Step S130, a manner for the first end device 40 to acquire the first target scene time 42 differs with differences in the types of data recorded in the capture time information 41, which is described in the following.

1) Each piece of the scene time information 21 stores playback time of a corresponding scene clip thereof. The capture time information 41 includes media record starting time and media record end time. When aligning the capture time information 41 with each piece of the scene time information 21, the first end device 40 acquires the first target scene time 42 with playback time recorded between the media record starting time and the media record end time and outputs the first target scene time 42 to the scene server 30.

2) The scene server 30 classifies all of the scene time information 21 according to record information of each piece of the scene time information 21 and derives multiple pieces of scene clip data 33 from the media data 11 according to classification results. The capture time information 41 includes a piece of time point data. The first end device 40 may transmit the first target scene time 42 recording the time point data to the scene server 30.

The scene server 30 acquires the first target scene time 42, the media data 11 provided by the media supply equipment 10 and the scene time information 21 provided by the metadata server 20 and aligns the first target scene time 42 with each piece of the scene time information 21 to extract multiple local scene clips 32 from the media data 11 according to alignment results so as to form a piece of media division data 31 (Step S140).

However, the scene server 30 also performs a different action according to a difference in data recorded in the first target scene time 42 which is transmitted by the first end device 40. For example:

1) when playback time between the media record starting time and the media record end time recorded by the first target scene time 42 which is transmitted by the first end device is a scene time information group, the scene server 30 may extract local scene clips 32 corresponding to the scene time information group to form a piece of media division data 31; and 2) when only a piece of time point data is recorded in the first target scene time 42 which is transmitted by the first end device 40, the scene server 30 aligns playback starting time and playback end time of the time point data with those of each piece of the scene clip data 33 to extract a piece of target scene clip data 33 having playback time including the time point data so as to form the media division data 31.

Figure 4:
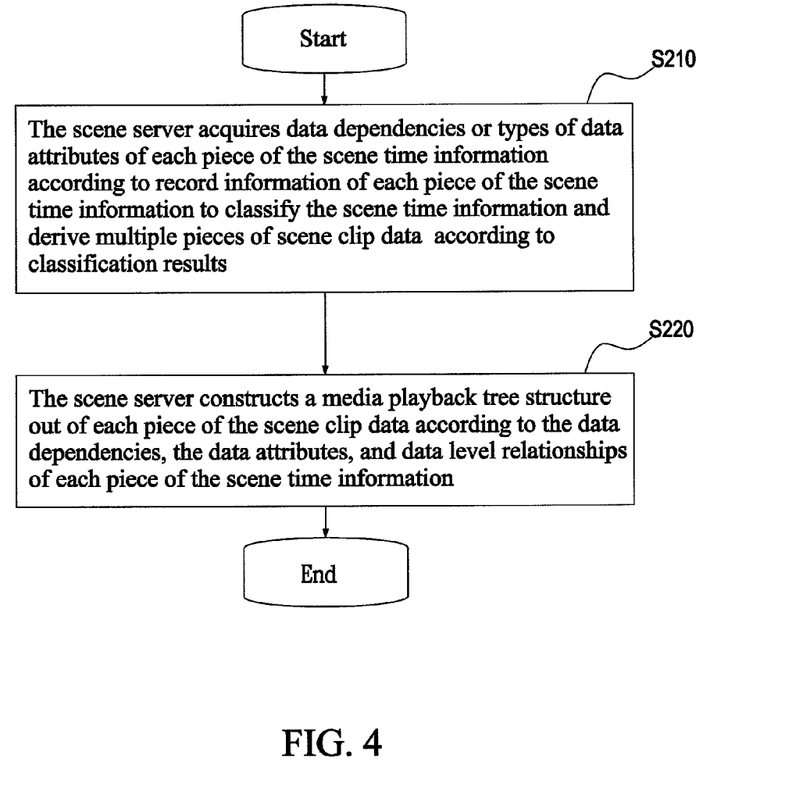
FIG. 4 is a schematic flow chart of constructing a media playback tree structure according to an embodiment of the present invention.

FIG. 4 is a schematic flow chart of constructing a media playback tree structure according to an embodiment of the present invention. With reference to FIG. 1 for better understanding, in this embodiment, the scene time information 21 also records the playback contents of the media division data 31 (or the local scene clips 32, or the scene clip data 33). The method includes steps in the following.

The scene server 30 acquires data dependencies or types of data attributes of each piece of the scene time information 21 according to record information of each piece of the scene time information 21 to classify the scene time information 21 and derive multiple pieces of scene clip data 33 according to classification results (Step S210).

The scene server 30 constructs a media playback tree structure out of each piece of the scene clip data 33 according to the data dependencies, the data attributes, and data level relationships of each piece of the scene time information 21 (Step S220).

Therefore, in Step S140, when acquiring the first target scene time 42, the scene server 30 may capture the local scene clips 32 from the media playback tree structure according to the first target scene time 42 to form the media division data 31.

Figure 5:
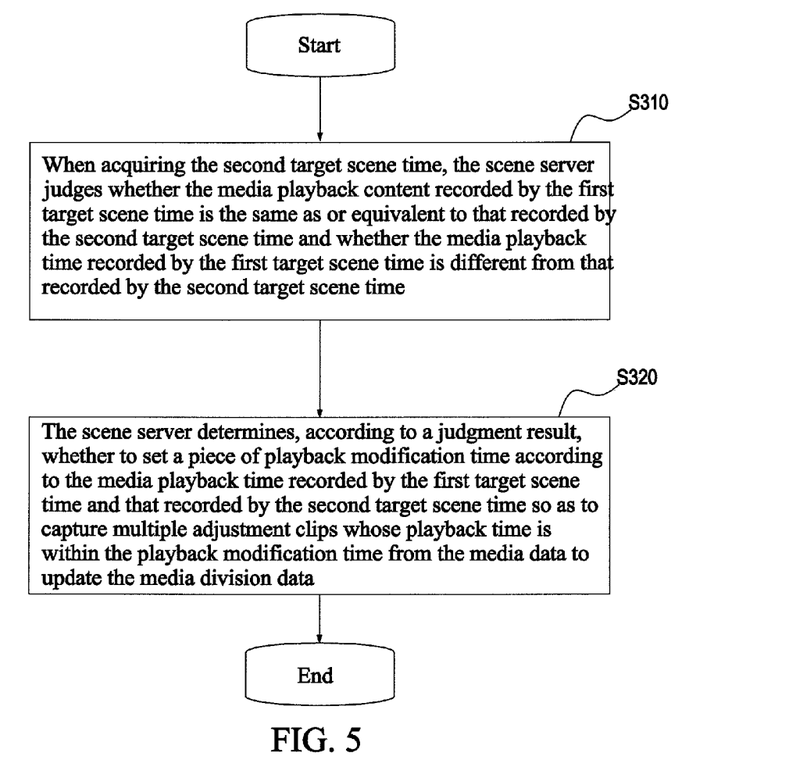
FIG. 5 is a schematic flow chart of a method for updating media division data according to an embodiment of the present invention.

FIG. 5 is a schematic flow chart of a method for updating media division data according to an embodiment of the present invention. With reference to FIG. 2 for better understanding, the method is applicable to a flow in which the scene server 30 acquires the first target scene time 42 and the second target scene time 52, which includes steps in the following.

When acquiring the second target scene time 52, the scene server 30 judges whether the media playback content recorded by the first target scene time 42 is the same as or equivalent to that recorded by the second target scene time 52 and whether the media playback time recorded by the first target scene time 42 is different from that recorded by the second target scene time 52 (Step S310).

The scene server 30 determines, according to a judgment result, whether to set a piece of playback modification time according to the media playback time recorded by the first target scene time 42 and that recorded by the second target scene time 52 so as to capture multiple adjustment clips whose playback time is within the playback modification time from the media data 11 to update the media division data 31 (Step S320). Moreover, the setting manner of the playback modification time is described as above, which is not described again herein.

Figure 6:
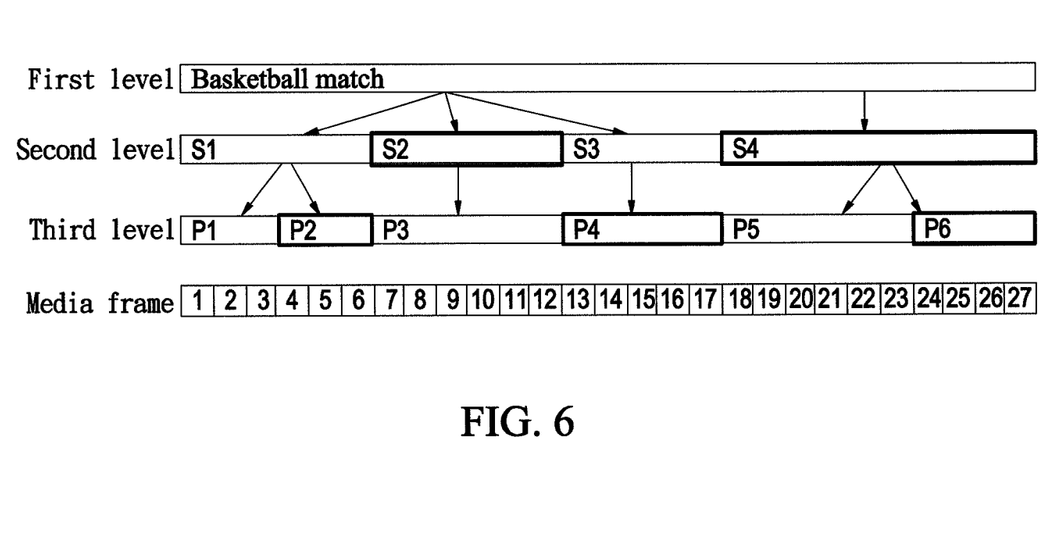
FIG. 6 is a schematic diagram of media levels according to an embodiment of the present invention.
Figure 7:
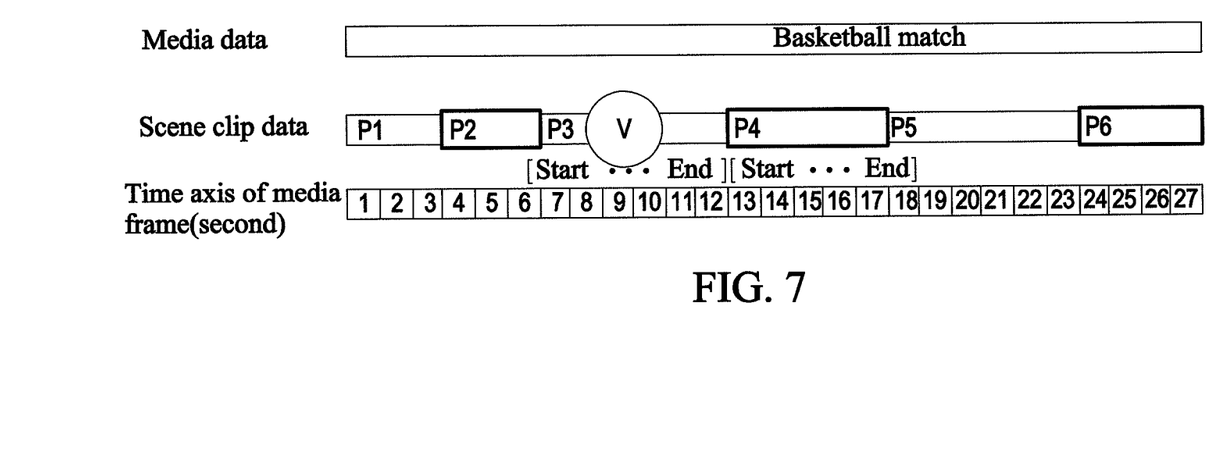
FIG. 7 is a schematic diagram of time point alignment of media division data according to an embodiment of the present invention.
Figure 8:
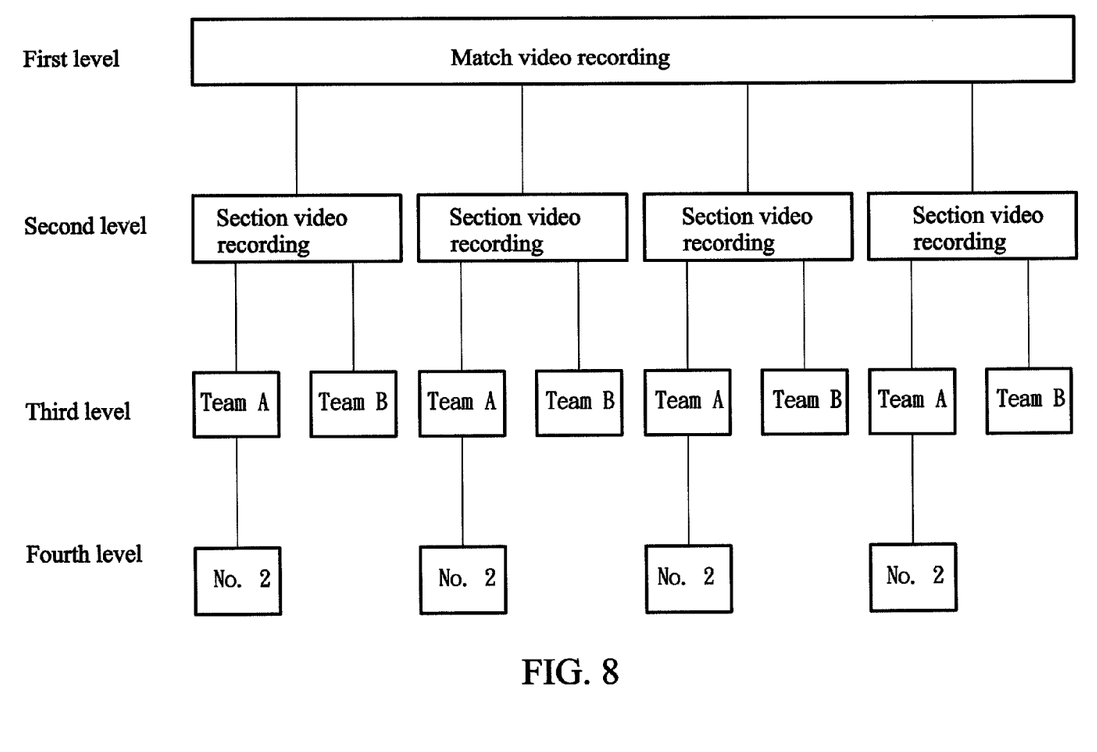
FIG. 8 is a schematic diagram of a media playback tree structure according to an embodiment of the present invention.

FIG. 6 to FIG. 8 are schematic diagrams of a condition of media control according to an embodiment of the present invention. Here, a recoding video of a basketball match is taken as the media data 11 for illustration.

FIG. 6 is a schematic diagram of media levels according to the embodiment of the present invention. The video recording of the basketball match may be divided into different image levels. A highest level is a video recording of the whole match. A second level is a recoding of each section. A third level is a recoding of close-ups. The whole video recording is constituted by a plurality of scene clips (that is, the preceding local scene clips 32 or the scene clip data 33) and corresponds to the scene time information 21.

FIG. 7 is a schematic diagram of time point alignment of media division data 31 according to the embodiment of the present invention. In this embodiment, the user views the media data 11 through the first end device 40. When the user views a specific image, for example, a "wonderful scoring image," the user marks the "wonderful scoring image". A marking manner may be any one of the capture time information 41 (that is, starting time and end time of the image), a mark symbol (adding a symbol note into the played scene clip), and a time point note. The first end device 40 transmits the first target scene time 42 corresponding to the marked data to the scene server 30. The scene server 30 extracts the scene clip data 33 (or the local scene clips associated with the transmission) corresponding to the first target scene time 42 to form the media division data 31 to be shared to other end devices. Taking FIG. 7 as an example, clip data marked (with a V-shape symbol in a round frame shown in FIG. 7) by the first end device 40 is a third piece of scene clip data 33 (P3), which corresponds to a scene clip from the seventh second to the tenth second.

FIG. 8 is a schematic diagram of a media playback tree structure according to the embodiment of the present invention. Here, a media playback tree structure may be constructed out of the image levels shown in FIG. 6 in cooperation with the preceding data dependencies or the types of the data attributes of the scene time information, and the scene time information 21 or the scene clip data 33 of the whole video recording.

A first level of the media playback tree structure is a video recording of the whole match. A second level is a branch of the video recording of the first level, namely, a video recording of each section. A third level is a branch of the video recording of the second level, namely, a video recording of close-ups of both parties during the match. A fourth level is a branch of the video recording of the third level, namely, a video recording of close-ups of specific players of both parties during the match.

However, the scene server 30 extracts the scene clip data 33 at any level according to the first target scene time 42 to form the media division data without giving consideration to the image levels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for constructing a scene clip, comprising:
   media supply equipment used for providing a piece of media data;
   a metadata server used for receiving the media data provided by the media supply equipment to provide and output multiple pieces of scene time information corresponding to playback scenes of the media data, wherein each piece of the scene time information stores playback time of the local scene clip corresponding thereto;
   a first end device used for acquiring the media data provided by the media supply equipment and the multiple pieces of scene time information provided by the metadata server, and used for inputting a piece of capture time information corresponding to playback of the media data when playing the media data, wherein the capture time information comprises media record starting time and media record end time, and the first end device outputs at least one piece of first target scene time whose playback time is recorded between the media record starting time and the media record end time; and
   a scene server used for acquiring each piece of the first target scene time, the media data, and the pieces of scene time information and aligning each piece of the first target scene time with the pieces of scene time information to extract, according to alignment results, multiple local scene clips from the media data to form a piece of media division data.

2. The system for constructing a scene clip according to claim 1, wherein each piece of the scene time information stores a playback content of the local scene clip corresponding thereto, the scene server classifies the pieces of scene time information according to record information of each piece of the scene time information and derives multiple pieces of scene clip data from the media data according to classification results, the capture time information comprises a piece of time point data, the first end device outputs the at least one piece of first target scene time recoding the time point data, and the scene server aligns playback starting time and playback end time of the time point data with those of each piece of the scene clip data to extract at least one piece of target scene clip data so as to form the media division data.

3. The system for constructing a scene clip according to claim 1, further comprising a second end device used for setting up at least one piece of second target scene time, wherein when acquiring the at least one piece of second target scene time and judging that a media playback content recorded by the at least one piece of first target scene time is the same as or equivalent to that recorded by the at least one piece of second target scene time and media playback time recorded by the at least one piece of first target scene time is different from that recorded by the at least one piece of second target scene time, the scene server sets a piece of playback modification time according to the media playback time recorded by the at least one piece of first target scene time and that recorded by the at least one piece of second target scene time, so as to capture multiple adjustment clips whose playback time is within the playback modification time from the media data to update the media division data.

4. The system for constructing a scene clip according to claim 3, wherein the playback modification time is a connex set of a media playback time length recorded by the at least one piece of first target scene time and that recorded by the at least one piece of second target scene time.

5. The system for constructing a scene clip according to claim 3, wherein the playback modification time is an intersection set of a media playback time length recorded by the at least one piece of first target scene time and that recorded by the at least one piece of second target scene time.

6. The system for constructing a scene clip according to claim 3, wherein starting time of the playback modification time is an average of starting time of the media playback time recorded by the at least one piece of first target scene time and that of the media playback time recorded by the at least one piece of second target scene time, and end time of the playback modification time is an average of end time of the media playback time recorded by the at least one piece of first target scene time and that of the media playback time recorded by the at least one piece of second target scene time.

7. The system for constructing a scene clip according to claim 1, wherein each piece of the scene time information stores a playback content of the local scene clip corresponding thereto, the scene server classifies the pieces of scene time information according to the playback content of each of the local scene clips, derives multiple pieces of scene clip data from the media data according to classification results, and constructs a media playback tree structure out of each piece of the scene clip data according to data dependencies, data attributes, and data level relationships of the pieces of scene time information.

8. The system for constructing a scene clip according to claim 7, wherein when acquiring the at least one piece of first target scene time, the scene server captures the local scene clips from the media playback tree structure according to the at least one piece of first target scene time to form the media division data.

9. A method for constructing a scene clip, comprising:
providing, by media supply equipment, a piece of media data;
receiving, by a metadata server, the media data to provide multiple pieces of scene time information corresponding to playback scenes of the media data, wherein each piece of the scene time information stores playback time of the local scene clip corresponding thereto;
acquiring, by a first end device, the media data and the pieces of scene time information to extract, according to a piece of capture time information input when playing the media data, wherein the capture time information comprises media record starting time and media record end time; outputting at least one piece of first target scene time whose playback time is recorded between the media record starting time and the media record end time from the pieces of scene time information; and
acquiring, by a scene server, the at least one piece of first target scene time, the media data provided by the media supply equipment, and the pieces of scene time information provided by the metadata server to align the at least one piece of first target scene time with each piece of the scene time information to extract multiple local scene clips from the media data according to alignment results so as to form a piece of media division data.

10. The method for constructing a scene clip according to claim 9, wherein each piece of the scene time information stores a playback content of the local scene clip corresponding thereto, the scene server classifies the pieces of scene time information according to record information of each piece of the scene time information and derives multiple pieces of scene clip data from the media data according to classification results, the capture time information comprises a piece of time point data, the first end device outputs the at least one piece of first target scene time recoding the time point data to the scene server, and the step of aligning the at least one piece of first target scene time with each piece of the scene time information to extract multiple local scene clips from the media data according to alignment results to form a piece of media division data comprises:
aligning, by the scene server, playback starting time and playback end time of the time point data with those of each piece of the scene clip data to extract a piece of target scene clip data to form the media division data.

11. The method for constructing a scene clip according to claim 9, wherein a second end device used for setting up at least one piece of second target scene time is further comprised, and the method further comprises:
when the scene server acquires the at least one piece of second target scene time and judges that a media playback content recorded by the at least one piece of first target scene time is the same as or equivalent to that recorded by the at least one piece of second target scene time and media playback time recorded by the at least one piece of first target scene time is different from that recorded by the at least one piece of second target scene time,
determining, by the scene server, according to a judgment result, whether to set a piece of playback modification time according to the media playback time recorded by the at least one piece of first target scene time and that recorded by the at least one piece of second target scene time so as to capture multiple adjustment clips whose playback time is within the playback modification time from the media data to update the media division data.

12. The method for constructing a scene clip according to claim 11, wherein the playback modification time is a connex set of a media playback time length recorded by the at least one piece of first target scene time and that recorded by the at least one piece of second target scene time.

13. The method for constructing a scene clip according to claim 11, wherein the playback modification time is an intersection set of a media playback time length recorded by the at least one piece of first target scene time and that recorded by the at least one piece of second target scene time.

14. The method for constructing a scene clip according to claim 11, wherein starting time of the playback modification time is an average of starting time of the media playback time recorded by the at least one piece of first target scene time and that of the media playback time recorded by the at least one piece of second target scene time, and end time of the playback modification time is an average of end time of the media playback time recorded by the at least one piece of first target scene time and that of the media playback time recorded by the at least one piece of second target scene time.

15. A non-statutory record medium, storing an electronic device readable program code, wherein an electronic device executes a method for constructing a scene clip when reading the program code, and the method comprises the following steps of:
  providing, by media supply equipment, a piece of media data;
  receiving, by a metadata server, the media data to provide multiple pieces of scene time information corresponding to playback scenes of the media data, wherein each piece of the scene time information stores playback time of the local scene clip corresponding thereto;
  acquiring, by a first end device, the media data and the pieces of scene time information to extract, according to a piece of capture time information input when playing the media data, the capture time information comprises media record starting time and media record end time; and outputting at least one piece of first target scene time whose playback time recorded between the media record starting time and the media record end time from the pieces of scene time information; and
  acquiring, by a scene server, the at least one piece of first target scene time, the media data provided by the media supply equipment, and the pieces of scene time information provided by the metadata server to align the at least one piece of first target scene time with each piece of the scene time information to extract multiple local scene clips from the media data according to alignment results so as to form a piece of media division data.

16. The non-statutory record medium according to claim 15, wherein a second end device used for setting up at least one piece of second target scene time is further comprised, and the method further comprises:
  when the scene server acquires the at least one piece of second target scene time and judges that a media playback content recorded by the at least one piece of first target scene time is the same as or equivalent to that recorded by the at least one piece of second target scene time and media playback time recorded by the at least one piece of first target scene time is different from that recorded by the at least one piece of second target scene time,
  determining, by the scene server, according to a judgment result, whether to set a piece of playback modification time according to the media playback time recorded by the at least one piece of first target scene time and that recorded by the at least one piece of second target scene time so as to capture multiple adjustment clips whose playback time is within the playback modification time from the media data to update the media division data.

* * * * *